United States Patent
Vroom et al.

(10) Patent No.: US 9,922,100 B2
(45) Date of Patent: Mar. 20, 2018

(54) SYSTEMS AND METHODS FOR FACILITATING THE DEVELOPMENT OF AN APPLICATION THAT ACCESSES DATA

(75) Inventors: Jeff Vroom, San Francisco, CA (US); Thomas Lane, San Francisco, CA (US); Christophe Coenraets, Newton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1631 days.

(21) Appl. No.: 12/271,288

(22) Filed: Nov. 14, 2008

(65) Prior Publication Data

US 2014/0250062 A1 Sep. 4, 2014

(51) Int. Cl.
*G06F 9/44* (2006.01)
*G06F 17/30* (2006.01)

(52) U.S. Cl.
CPC .... *G06F 17/3056* (2013.01); *G06F 17/30578* (2013.01)

(58) Field of Classification Search
CPC .............. G06F 17/30716; G06F 9/465; G06F 17/30607; G06F 17/3061; G06F 17/30994; G06F 9/44
USPC ................. 717/122, 168–174; 713/1–2, 100, 713/150–187; 707/103, 609–686, 707/790–812
See application file for complete search history.

(56) References Cited

U.S. PATENT DOCUMENTS

| | | | |
|---|---|---|---|
| 5,313,616 A * | 5/1994 | Cline et al. | 717/127 |
| 5,794,042 A * | 8/1998 | Terada et al. | 717/101 |
| 5,991,751 A * | 11/1999 | Rivette et al. | |
| 6,268,853 B1 * | 7/2001 | Hoskins et al. | 700/83 |
| 7,254,570 B2 * | 8/2007 | Stickler | G06F 17/30011 |
| 2004/0006745 A1 * | 1/2004 | van Helden et al. | 715/516 |
| 2008/0045190 A1 * | 2/2008 | Ballou | H04M 3/4938 455/414.2 |
| 2009/0210459 A1 * | 8/2009 | Nair | G06F 17/2288 |

\* cited by examiner

*Primary Examiner* — Jae U Jeon
(74) *Attorney, Agent, or Firm* — Kilpatrick Townsend & Stockton LLP

(57) ABSTRACT

Certain embodiments facilitate developing an application using a client-side object model to data source mapping. This may involve defining data use on the client side of the application in various ways that simplify the development necessary to implement data access features. In certain embodiments, data access and synchronization between a client and a data source is accomplished by configuring the client to map to a set of remote procedure call operations for a given data source. For example, the user may implement or confirm update, create, delete, and retrieve function calls for a given data source such that the application can implement data access and updating using those functions. Embodiments use persistent object identifiers, change logs, and/or data bindings in a client to provide various features and benefits. Certain embodiments also facilitate conflict resolution, demand paging, and lazy loading.

27 Claims, 4 Drawing Sheets

SYSTEMS AND METHODS FOR FACILITATING THE DEVELOPMENT OF AN APPLICATION THAT ACCESSES DATA

FIELD

Embodiments of the present disclosure relate generally to the development of computer software, content, and other applications and to applications that use, update, and otherwise access remotely stored and other data.

BACKGROUND

Many application developers are familiar with developing applications with code and data conveniently located on either a client or a server. For example, traditional web applications involves a fairly simple programming model using a client web browser and web server. In this model, web page developers generally need not address synchronization and other issues that are present in other contexts because each time a web page is retrieved the application is resynchronized with the server.

However, building rich Internet and various other applications often involves a different programming model in which code and data are located in different client and server locations. For example, in many cases there is one version of data on the server and another on the client and a need to copy data back and forth and keep the server and client synchronized with one another. Many applications provide a persistent client that runs for a relatively long period and involves multiple instances of retrieving and updating data. Developing these and other applications can involve having to expressly address potential synchronization and other issues. For example, in many contexts, a developer is required to provide a significant amount of programming code to affirmatively control each event that causes the creation of, requesting of, updating of, and/or deletion of data that is stored at a server or remote location. In some cases, a developer may need to ensure that appropriate data synchronization occurs in the context of, among other things, various events potentially triggering various types of data access from multiple clients accessing the same data on multiple data servers. Developers must also address circumstances in which a given piece of data is displayed and updated at multiple places within an application being developed.

SUMMARY

Certain embodiments facilitate developing applications that access data from a data source such as a remote database. Such development may be facilitated by linking a data model on the client side of the application to the data source. This can be used during development to simplify the development needed to implement data access features. For example, the data model may use data-linked objects that can be synchronized on command (such as, for example, a commit command, a refresh command, etc.) with remote data sources using general data access operations provided or confirmed by a developer. Exemplary data access operations include create, retrieve, update, and delete operations. As a specific example, an operation may populate a data structure with the results of a query retrieving data from a database.

Once a link or mapping is defined by these operations, an application can be developed using the data-linked object as a source of information on the client side. For example, a developer can specify how client components relate to the data-linked object. As a specific example, a data-grid DG displays data from data-linked collection object C, which can be synchronized with data source DS. Embodiments also use persistent object identifiers, change logs, and data bindings in a client to provide various features and benefits. Certain embodiments also facilitate conflict resolution, demand paging, and lazy loading.

One exemplary method comprises receiving a mapping of an object model to a data source. The mapping is received for use in a client application that accesses data from the data source. The object model comprises at least one object having a data structure of properties for data from the data source. The method may also involves creating a change log for storing information about changes made in the client application since a last synchronization and/or receiving a data binding for linking the object and a data-displaying component in the client application. A data binding, for example, may change data displayed at the data-displaying component in response to an event triggered when data of one or more object properties changes. The method may further comprise providing a client application based on the information received. In use the application the client application accesses data at the data source according to the mapping in response to receiving a synchronization command. For example, if the synchronization command is a refresh command, it may receive data for the object according to mapping and update the data-displaying component according to the data binding. Alternatively, if the synchronization command is a commit command, the client application may send changes to the data source from the change log according to the mapping.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Figure 1:
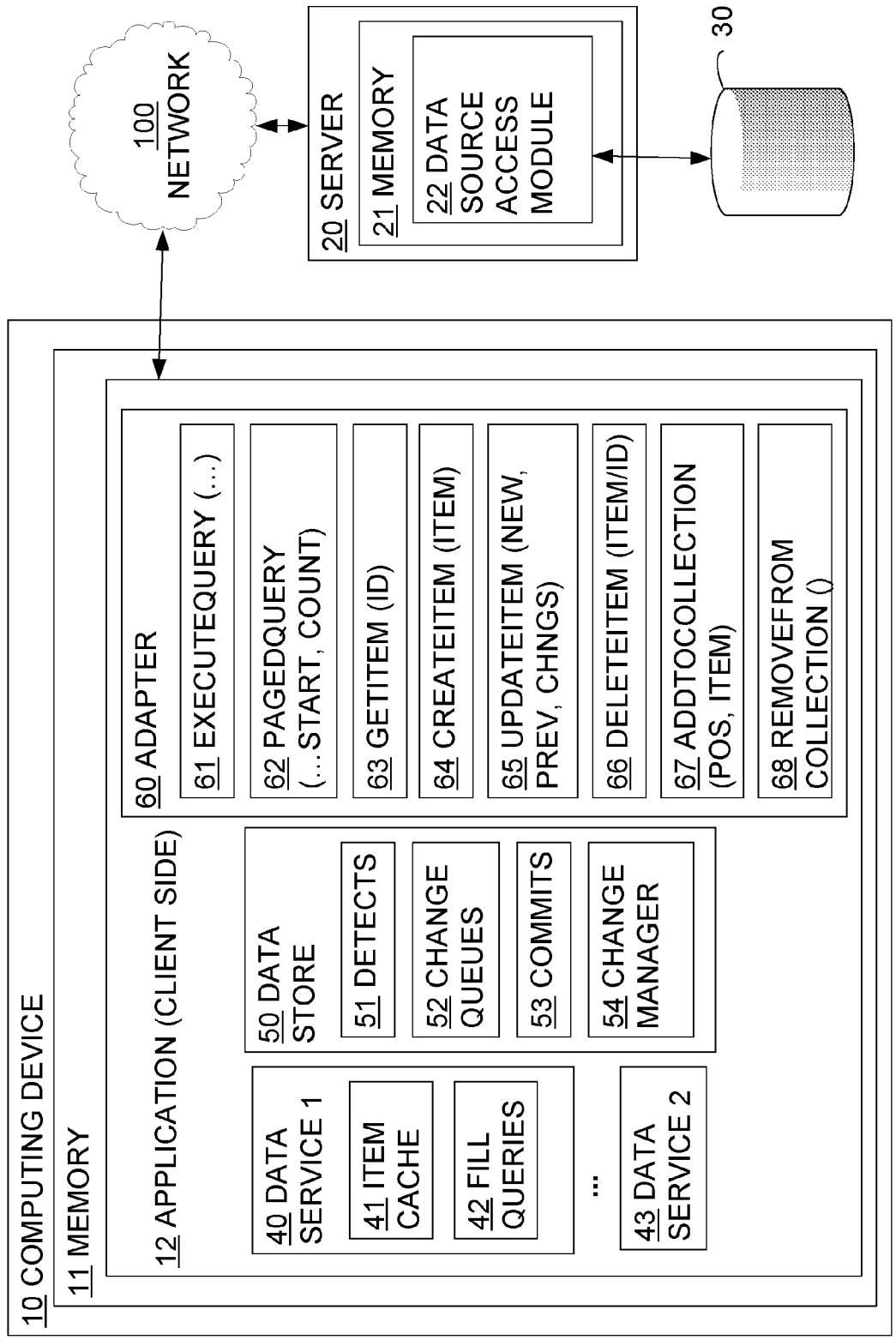
FIG. 1 is a system diagram illustrating an exemplary network environment.

The following specific illustrative embodiments and features are provided to introduce certain aspects of certain embodiments of the present disclosure and to illustrate some of the applications, uses, and benefits of various features. Certain embodiments facilitate the development of an application that includes, uses, or otherwise accesses data from a data source such as a remote database. As examples, such an application may display one or more representations of the data in charts, text fields, graphics, and/or allow an application user to use the application to make changes to the remotely stored data. As a specific example, an application may provide account information to users and allow users to add to or change that account information. For example, a user may correct an incorrect spelling of the user's last name in the application and have the change made to the data at a data source.

Certain embodiments facilitate developing an application using a client-side object model to data source mapping. This may involve defining data use on the client side of the application to simplify the development necessary to implement data access features. In certain embodiments, data access and synchronization between a client and a data source is accomplished by configuring the client to map to a set of remote procedure call operations for a given data source. For example, the user may implement or confirm update, create, delete, and retrieve function calls for a given data source such that the client application can implement data access and updating using those functions.

In some cases, a developer may need only define or confirm a data model to data source mapping and provide one or more commit or other synchronization commands at appropriate points in the application to implement an application that accesses data. A developer may not need to code or otherwise provide specific calls to server functions and/or individually specify changes. As a specific example, a developer may simply specify that when a given button is clicked on the application's user interface, the application should commit data associated with one or more client side objects without manually specifying how the application should determine what has changed.

Some embodiments facilitate synchronization according to an object model to data source mapping, using persistent object identifiers, change logs, and/or data bindings in a client side of a development application. A persistent object identifier may be assigned to an object to ensure that there is one consistent instance on the client, and is thus "persistent" in the sense that if a data record provides data associated with a given identifier, no other record will be provide other data associated with that identifier. The identifier may be used as a key to look up and retrieve an object instance from a data source and may be used to avoid potential problems resulting when duplicate copies of the same object are used on the client. In other words, it may prevent different objects or object copies on the client from trying to update the same data source data in different ways. Accordingly, the use of persistent object identifiers may facilitate the implementation of the object model to data source mapping described above.

A change log may also facilitate synchronization according to the object model to data source mapping. A change log may identify all changes made since data was last synchronized. Upon a synchronization command in the application, such as, for example, a commit command, the change log can be used based on the defined mapping operations to communicate directly or indirectly with a data source. The changes listed in the change log may be sent to the data source.

Data bindings can also facilitate data access and use according to the object model to data source mapping and provide various advantages in certain embodiments. A data binding may be used to achieve consistent updating of all views of a data model object by providing a binding between properties of different components that causes one property to update when another bound property is updated. Data bindings can enhance the usefulness of a client-side data model by ensuring that components that are associated with a given object are all synchronized to one another. As a specific example, a content application may display a user's name at multiple places within a user interface and allow editing of the name at one or more of these places. Data bindings may be used to ensure that whenever the user's name is changed in one place, it is changed in the other places, and reflected in the object model for eventual synchronization with the data source.

As another example, a content application may have multiple components that display and allow editing of a particular property such as a customer's credit card number. Each of these components may have a data binding with one another and a data model object—a customer object. If the content application user changes the credit card number property at any of the components, all properties of the bound components, as well as the data model object, may be automatically updated based on the data bindings. This may also be logged in a change log and, on the next commit, the changed data model object property—the customer object's credit card number—may be used to update the remote data source, replacing the credit card number previously associated with the customer with the newly supplied customer number. The term "content application" is used herein merely to distinguish that application from a development application used to develop an application. A content application can be any type of application and is not limited to any particular content or format.

A content application can also refresh the data model object if the data source is changed. For example, a content application may access a remote database to access data about all customers subscribed to a particular service. If, during use of the content application, a new customer subscribes to the service through a website and new customer information is added to the database, the content application may subsequently be updated with the new customer information. For example, when the customer object is refreshed, the customer object and data on the database may be synchronized using the operations defined by the developer. The customer object receives a new instance and an event is triggered to update all components bound to the customer object properties. Specifically, if the application displays a data grid with a list of customers (e.g., with a first name column and a last name column), a new entry may be added to the data grid based on a data binding between the first name property of the data grid and a first name property of the customer object and a data binding between the last name property of the data grid and the last name property of the customer object. Other features and techniques may of course be used to ensure consistent display and updating of data and the other features discussed herein.

The preceding examples were provided to introduce certain aspects of certain exemplary embodiments. Additional feature, alternatives, and aspects of additional embodiments are discussed below and will be apparent to those of skill in the art based on the principles and techniques discussed herein.

Illustrative Network Configuration

Referring now to the drawings in which like numerals indicate like elements throughout the several Figures, FIG. 1 is a system diagram illustrating an illustrative network environment according to certain embodiments. This exemplary embodiment involves a three-tier architecture in which a server serves as an intermediate server 20 between a client application 12 residing in memory 11 of a client computing device 10 and a database 30 that stores data used by the application's client side 12. For convenience, the "client side of the application" is referred to herein simply as the "client" or "client application," which all generally refer to an application or portion of an application that resides or is executed on a computing device separate from the server that the application or portion of the application communicates with to access data. Generally, the client is located within a single computing device that includes the application or portion of the application in its memory.

The environment 1 shown in FIG. 1 comprises a wired or wireless network 100 connecting various network devices 10, 20. Features of the devices 10, 20 are shown as functional or storage components residing in memory 11, 21 on the respective devices. Such applications may be resident in any suitable computer-readable medium and execute on any suitable processor. For example, the network devices 10, 20 shown each may comprise a computer-readable medium such as a random access memory (RAM) coupled to a processor that executes computer-executable program instructions stored in memory 11, 21.

In the exemplary three-tier model illustrated in FIG. 1, the client 12 communicates with the server 20 which then communicates with the database 30. A three-tier model may provide various advantages with respect to scalability, security, and other features. However, certain embodiments alternatively involve a two-tier environment in which a client communicates directly with a database. Other embodiments may involve other alternative system configurations.

The various components on the client 12 provide data access features of certain embodiments described herein. For example, certain embodiments involve receiving a mapping for use in an application that accesses data from a data source. Such a mapping may involve linking an object model in the application to the data source, for example, by providing object operations 61-68 that link to data source operations of data source access module 22. Such a mapping may involve renaming and substituting parameters, among other things.

In the example shown in FIG. 1, the adapter 60 comprises operations 61-68 that collectively provide an object model to data source mapping. These operations and the parameters of the operations can be determined by an application developer to create the mapping. As shown, exemplary operations include executeQuery( ) 61, pagedQuery(start, count) 62, getItem(id) 63, createItem(item) 64, updateItem (new, prev, chngs) 65, deleteItem (item/id) 66, addToCollection(pos, item) 67, removeFromCollection ( ) 68. In certain embodiments, these exemplary operations are managed operations that are mapped to server side operations on a data source through a flexible mapping scheme. Each managed operation has the name of the corresponding server operation specified. The parameters of the managed operation may also be mapped through a named lookup table to the parameters of the data source operation. For example, the "getItem" might be mapped to an operation "getBook" which takes the identity of the book and "createItem" might be mapped to "createBook" etc.

An exemplary exeucteQuery operation( ) 61 may take a list of parameter objects and return a set of managed objects from the data source. Each object returned by the executeQuery operation ( ) 61 may have a primary key. Before the results are returned from the data source through the management layer, the operation can determine whether there is an existing instance with the given primary key. If not, this object instance becomes the instance used for that primary key until this query is released or the object is deleted. If there is an existing object instance, such as, for example, one in the cache 41, for the primary key, the properties of the new version of that object are copied into the existing object. The now updated existing object in the cache 41 is then returned from the query to the application thus giving it a simpler and more consistent view of the data in the underlying data source. Similarly, an exemplary pagedQuery(list of parameters, start, count) operation 62 can operate similar to the executeQuery operation 61 but instead of returning the entire query result set, it can returns a range of the results in the query—from start to count.

An exemplary getItem(id) operation 63 requests a single object from the data source using the primary key or other identifier of that object. If the object is not found, null is returned. If the object is found, the operation searches for an existing instance in the cache 41. If found, the properties of the new instance are merged into the existing one and return the existing instance. An exemplary createItem(item) operation 64 takes a new object and sends it to the mapped data source operation. If the object can be added to the data source and the primary key of the object was not assigned on the client, the new primary key of the object is returned. An exemplary updateItem(new, prev, changes) operation 65 takes at least the new item and applies the property values contained in that object to the data source. To optimize this process, the list of properties returned are provided. The original or previous version of the object is also provided to facilitate conflict detection, e.g., determining if anyone else has changed this object since it was fetched by a client application. An exemplary deleteItem(item/id) operation 66 takes either the primary key or the current version of the object from the application and tries to remove that object from the data source. An exemplary addItemToCollection (pos, item) operation 67 takes the set of parameters which define an association between those parameters and a set of objects which is persisted in the data source. When a new object is added to that collection on the client, this exemplary operation allows the data source to associate the given object with that set of association parameters. The position indicates where in the collection on the client the object was added in case the association is an ordered association. An exemplary removeItemFromCollection 68 can function similar to the addItemToCollection (pos, item) operation 67 but instead remove the association information for the object.

A developer may define operations such as these operations 61-68 and parameters for such operations based on the particular details of the data used in the application and the details of the database 30 that is accessed. In certain cases, these operations can be implemented as remote procedure calls that are sent through the network 100 and access the database 30. For example, the operations may access data through the data store access module 22 intermediary resident in the memory 21 of server 20. In certain embodiments, there is nothing on the server 30 that is managed by the application. Thus, the data source access module 21 can be generic and need not be specific to the application. Alternatively, the client 12 may be implemented to access data directly from a database.

As shown in FIG. 1, the client also includes various data services 40, 43 and a data store 50. Exemplary data service 40 includes an item cache 41 and fill queries 42. An exemplary item cache 41 can temporarily store unique item instances retrieved from a data source. These instances can remain in the item cache 41 for as long as they are in use in the application 12. Data services 40 can ensure that the item cache 41 does not include duplicates and merges in data when appropriate. For example, if two queries are made against a data source, the data service 40 can make sure that the application 12 does not get two different items in the cache that refer to the same thing. The exemplary fill queries 42 can keep track of identities of objects returned by queries to determine if items can be removed from the item cache 41. For example, if a query is re-executed and a completely different set of instances are returned, data service 40 may use the fill queries 42 information to remove items that are no longer in use from the item cache 41.

Exemplary data store 50 includes detects 51, change queues 52, commits 53, and a change manager 54. An exemplary data store 50 may include a change manager 54 that functions to manage the tracking of changes, for example, using a change queue or change log 52, keeping track of changes made to data at the application 12. The detects function 51 can detect such changes and add them to the change queue 52, and the commits function 53 can manage committing any changes to the data source when needed and update the change queue 52 appropriately upon such commits.

Illustrative Features Facilitating Development of a Data Accessing Application

Figure 2:
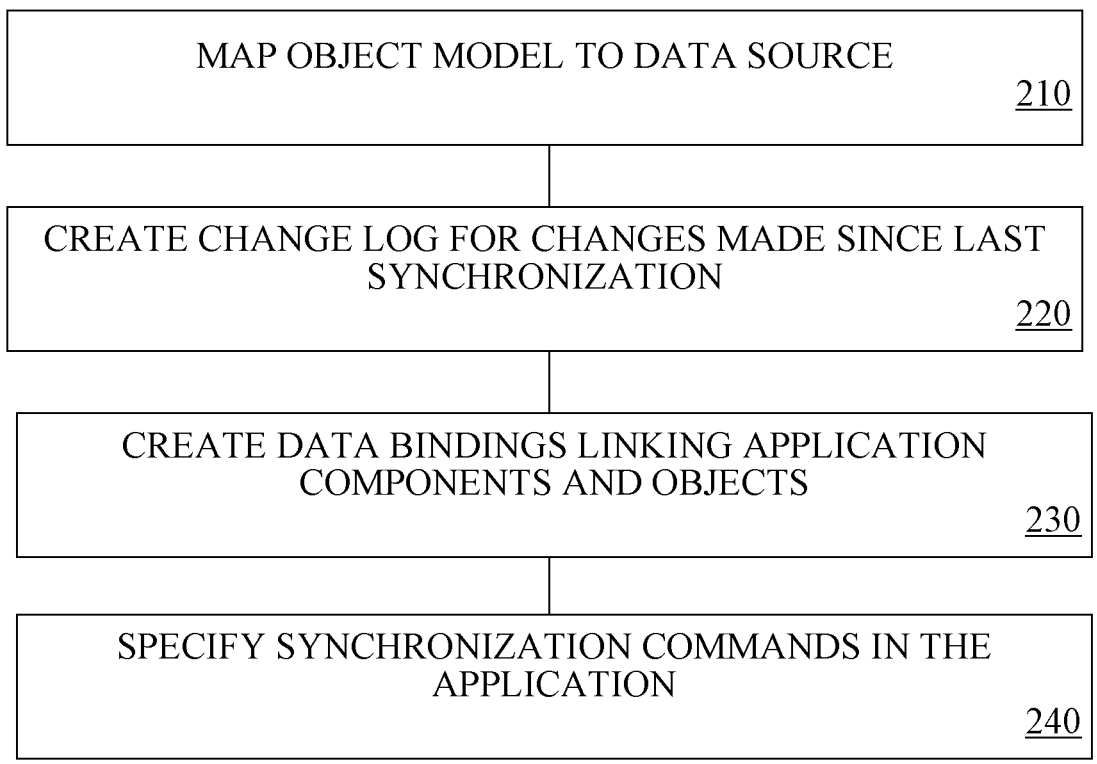
FIG. 2 illustrates an exemplary method of developing an application that accesses data from a data source.
Figure 2:

FIG. 2 illustrates an exemplary method of developing an application that accesses data from a data source. The method 200 comprises mapping an object model to a data source, as shown in block 210. As described above with respect to FIG. 1, such a mapping may be implemented as an adapter 60 on the client side of an application 12. Using such a mapping may involve modeling data and defining data use on the client side of the application in various ways that simplify and/or reduce the development necessary to implement data access features in an application. The mapping may specify all of the key operations needed to define and use a data source. For example, the mapping may comprise one or more object operations linked to one or more data source operations and involve parameter substitution and renaming, among other things.

Figure 3:
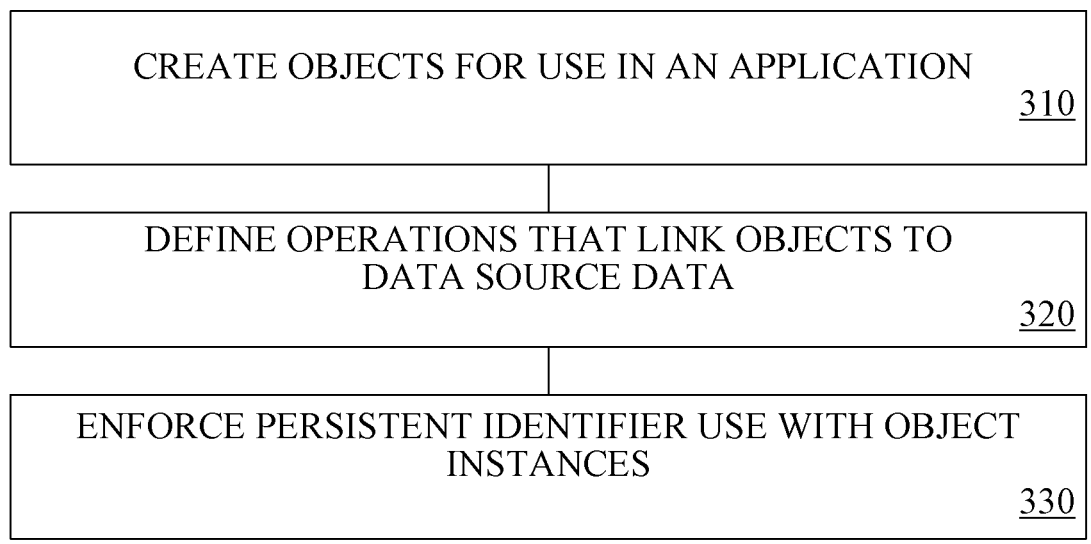
FIG. 3 illustrates an exemplary method of creating an object model to data source mapping.

FIG. 3 illustrates an exemplary method 210 of mapping an object model to data source. The method 210 comprises creating objects for use in an application, as shown in block 310 of FIG. 3. For example, if a developer knows that an application will utilize information about a customer, a customer object may be created as a data structure to store information about customer instances that will be used in the application. The customer object may have multiple properties, such as, as examples, customer first name, customer last name, customer address, customer phone number, customer account number, customer account balance, etc.

The method 210 of mapping an object model to data source further comprises defining operations that link objects to data source data, as shown in block 320 of FIG. 3. For example, the customer object example described with respect to block 310 may be mapped to one or more data sources. For example, the customer object may be mapped to a customer database table so that the properties of that customer object can access the database table to obtain and change object property values. Alternatively, an object can be mapped to multiple data sources, such as, for example, multiple database tables from different databases. One example of this alternative is linking the customer first name, customer last name, customer address, customer phone number properties to one customer database table and linking the customer account number and customer account balance to a different customer database, such as one containing information about customer accounts.

Defining operations that link objects to data source data, block 320 of FIG. 3, facilitates data access and/or synchronization between a client and a data source. The operations, for example, may include a set of remote procedure call operations for a given data source. Exemplary operations perform various create, retrieve, update, delete, and other synchronization functions. Specification of these operations may provide a model for where data is stored by specifying, as examples, how to get data, how to update it, how to create records, how to delete records, how update them, how to query, etc. A developer may specify or confirm these operations in a variety of ways. For example, for a create operation, the developer may identify that the operation takes the new object as its first argument and returns a persistent identifier for that object instance and/or returns a new object instance. As another example, for an update operation, the developer may provide a certain signature, identify that the operation takes the new version of the object and the original version of the object that should correspond to what the server currently has. Additional exemplary operations are described herein and with respect to FIG. 1's adapter 60.

The method 210 of mapping an object model to data source further comprises enforcing persistent identifier use with object instances, as shown in block 330 of FIG. 3. This may involve ensuring that there will only be one instance of the same data for an object provided to an application. For example, if a person record with identifier "ID2" is provided, a different person instance with that same identifier will not be provided. Thus, a persistent identifier assigned to an object instance may be used as a key, for example, to look up and retrieve an object instance from a data source. Every object instance that a developer uses is given a persistent identifier. Enforcing persistent identifier use may also involve determining that certain data has already been retrieved for a data object so that the application knows to update that data rather then creating a new object instance. Persistent object identifiers may be implemented as part of or determined using the object relational mapping that maps an application's object model onto a relational database model. As described with respect to block 320, a persistent object identifier may be used as a send and/or return parameter of one or more of the operations defined to link an object to one or more data sources.

The steps of creating objects for use in an application 310, defining operations that link objects to data source data 320, and enforcing persistent identifier use with object instances 330, are one exemplary technique for accomplishing the more general function of mapping an object model to a data source of block 210 of FIG. 1. The steps 310, 320, 330 illustrated in FIG. 3 can be combined, implemented in a different order than the one illustrated, may involve many variations, and one or more of these steps 310, 320, 330 may be implemented elsewhere in the general method 300 of developing an application that accesses data from a data source shown in FIG. 2 and other methods and systems provided according to the concepts disclosed herein.

Returning to FIG. 2, in addition to mapping an object model to a data source, the method 200 further involves creating one or more change logs for changes made since last synchronization, as shown in block 220. As an application is running, properties of one or more of the application's objects may change. For objects associated with or mapped to a data source, as properties are modified a list of the changes (i.e., a change log) is created identifying all changes made since data was last refreshed or otherwise synchronized. In certain embodiments, the application can be configured to send those changes to the server with a simple commit or other synchronization command. In response, for example, the change log may be sent to the server so that the client and server can be synchronized. Synchronization may involve pushing changes from the client to the server or data source and/or refreshing the client based on any changes that might have been made on the server or data source since the client retrieved data.

The method 200 further involves creating data bindings linking application components and objects, as shown in block 220. A developer may provide multiple user interface parts that are associated with the same object property, such as, for example, different controls or components on different panels showing the same object property. If data is changed on the server and the application refreshes, the application may update all the views of the corresponding object appropriately. Generally, a client-side data binding or other feature may be used to achieve consistent updating of all views of an object. Such views may be components within the application that are linked to a given object. A data binding is a binding between properties of different components or objects that causes one property to update when another bound property of another component or object is updated. For example, a property of one client component can be bound to some other component's property. This provides a link between these two properties so that whenever a property changes, the system is notified and can keep all associated properties synchronized. A data binding can be event driven. For example, a data binding may map property B-prop on component B to property A-prop on component A such that if property A-prop is changed (for example, from 3 to 4) an event mechanism can trigger updating of B-prop, which will also change to 4. A binding be one way or two way. For example, a text property C-prop of one component may be bound to a text property D-prop of another and vice versa. Updating C-prop causes D-prop to change and updating D-prop causes C-prop to change.

The method 200 comprises specifying synchronization commands in the application, as shown in block 240. Once an object model has been mapped to the data source, the client can implement data access and updating using those operations. With such a model in place, a development application can provide various automated features to facilitate use of the data from the data source. This can make coding much simpler. For example, in certain embodiments a developer can simply call commit changes, and the details of the particular data access can be determined without the developer having to provide additional code. In the past, without this functionality available, a developer may have had to write a significant amount of additional code, for example, determining what has changed inside on any or all component linked to a data source and making one or more specific calls for each change.

In some cases, the mapping, change log, and data bindings provided in blocks 210, 220, and 230 of FIG. 2 can collectively or individually also facilitate error handling. If any errors occur, error handling can be performed to ultimately ensure that the client and server are synchronized. As examples, the whole batch of changes in the change log can be rolled back or only the individual changes that failed can be rolled back. In one embodiment, if all the changes are successfully reconciled, then the change log is cleared on the client side. If any of the changes failed, those changes may remain pending on the client, for example, as a list of exceptions. The list of exceptions may be used to roll back those changes or retry committing the changes. In many embodiments, a developer is not required to affirmatively code or otherwise address error handling because errors can be handles automatically based on the mapping, change log, and data bindings configuration provided by the developer.

Illustrative Use of a Collection and Other Data-Linked Objects

Certain embodiments of the present disclosure provide data-linked objects on the client-side of an application that can be synchronized on command with remote data sources using general operations provided or confirmed by a developer. For example, these operations may provide a link between the object on the client side and data from the data source so that the object and data source can be easily synchronized with a simple commit, refresh, or other synchronization command. An application can then be developed using the data-linked object as a source of information on the client side. For example, a developer can specify how client components relate to the data-linked object, such as, for example, data-grid DG displays data from collection C which can be synchronized with data source DS. Such a collection, for example, may be an object that represents and holds the results of a query to a data source and, when changed, sends appropriate operations to update the data source. Accordingly, once such a collection is linked to a data source through these operations, a developer can simply create user interface and other application features, such as, for example, data grids, text boxes, etc., by working with the collection.

Figure 4:
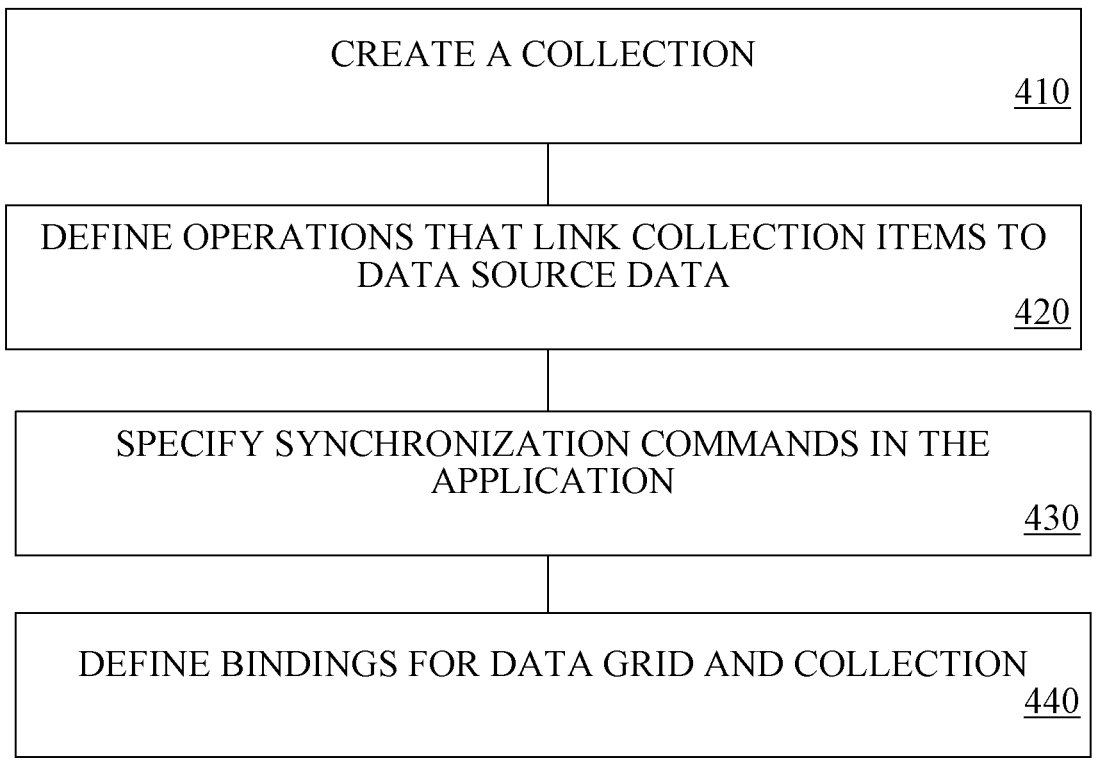
FIG. 4 illustrates an exemplary method of developing an application that uses a collection to access data from a data source and populate a data grid of the application.

FIG. 4 illustrates an exemplary method 400 of developing an application that uses a collection to access data from a data source and populate a data grid of the application. To illustrate the method 400, the following discussion provides an example of developing an application for accessing and changing remotely stored book recommendation information. The method 400 involves creating a collection, as shown in block 410. For example, a developer creates a collection for holding information about the current month's recommended books.

The method 400 further comprises, defining operations that link the collection items to data source data, as shown in block 420. In the book recommendation example, the developer associates the collection with a query to retrieve the information from a remote book database and other operations accessing that database, e.g., create, delete, update, etc. Once the collection is linked to the data source via these defined operations, the developer need only consider the data source in terms of if and when the collection and data source need to be synchronized, for example, by refresh, commit, and other synchronization commands.

Thus, the method 400 further comprises, specifying synchronization commands in the application, as shown in block 430. In the book recommendation example, the developer may use a simple refresh command to automatically retrieve any updated book information, such as, for example, any changes resulted from the data source being updated by a second application. As a specific example, at some point during execution of the application, the application may specify a refresh and, in response, a query may run to populate or update the collection with this month's recommended books currently stored at the data source.

The method 400 further comprises defining a data grid and binding it to the collection, as shown in block 440. The exemplary book recommendation application is defined to includes a data grid component that is used to display the book recommendation information collected in the collection. In this example, the developer specifies that the application uses the collection to populate the data grid and possible other components displayed in an application. With respect to binding the collection and the data grid, the developer may associating a first column of the data grid with a first component of the collection, a second column of the data grid with a second property of the collection, etc. There need not be a one-to-one correspondence between the collection and the data grid. As another example, one or more data bindings may be defined so that a change to the collection, data-grid or other component can trigger an event that causes all associated components to also update.

In one embodiment, the use of a collection facilitates selective updating of collection and application components. For example, the general operations provided by the developer to define the link between the collection and the data source may be used to get current data from the server, compare the current data to the list currently on the client side, and make incremental changes to stitch in just the new book on the data grid. In developing such features in the past, a developer would typically have to do all that work manually with express code, e.g., re-executing the query in a new collection, pointing the data grid at the new collection, performing any necessary re-ordering, identifying differences, etc.

The exemplary application further allows an application user, such as a librarian responsible for making book recommendations, to edit and update the recommended book list displayed in the data-grid. For example, a librarian may add a new book record on the data grid. This exemplary application provides a "finished" button that commits any change made by the application user. For example, changes to the data-grid may be reflected in the collection and, upon commit, an appropriate operation may be sent to the data source to make these changes to the data at the data source. The developer may have simply specified that a click event of this "finished" button causes a commit. That change can be applied to the data source using the one or more operations generally defined by the developer linking the collection to the data source.

Illustrative Data Paging Embodiments

Certain embodiments facilitate data paging or on demand paging. Such paging may be appropriate, for example, when there is a really large data set, such as, for example, 100,000 rows on the server, that is accessed for populating a collection and associated data grid. A limited user interface region within the application may be allocated to display the data grid, with a scroll bar provided to access additional data. In many cases, an application user may never look below the first page of a data grid, ignoring the opportunity to scroll down for more rows or columns of the data grid. Thus, in many cases it is desirable to limit initial query that populates the collection and data grid to avoid, as an example, having to wait for all 100,000 records to come back and be rendered.

Certain embodiments facilitate data paging by including a start parameter in the query operation of the mapping between the collection and the data source. The start parameter, for example, may specify the first item request and a count specifying how many items should be retrieved by the query. The development application may interpret or otherwise use this information to implement this paging. For example, when the initial query is run, the application may only retrieve the first page that is visible in a data grid, and then as a user scrolls, it may automatically retrieve data for the next page. An application developer need not be aware of or specifically address this paging feature. For example, the application may implement the data grid component and the collection defined by the developer and automatically configure appropriate paging parameters and features based on the information specified for those items, such as, for example, the count provided in the query and/or the number of items that will fit on the space allocated for a data grid, etc.

Illustrative Conflict Resolution Embodiments

Certain embodiments facilitate conflict resolution by tracking both the original version of an object and the changes made to the object, and sending both to a data source server in any change request operations. The data source server may identify potential conflicts by comparing the original version with what is currently has in the database, for example, by determining whether the application requesting a change was synchronized with a given record before starting the modifications. If somebody else had changed the record, the server may flag that as an error and send an error or other indication back to the client. The error or indication may provide the current server value of the record at issue. The client can receive that error or indication message and initiate a conflict event. It may package the original version, the current server version, and the changed version together, and allow an application user to view these values to resolve the conflict. For example, it may present this information to a user in a dialog box and allow the user to accept a particular version or provide a new value and then process the change so that the server is appropriately updated. Certain embodiments facilitate this type of conflict resolution by ensuring that the object model to data source mapping is configured in such a way that relevant information is available to the application developer. For example, the linking operations may be required to implement changes with a parameter that includes the original value at the application and the changed value at the application. Various alternative configurations and additional benefits are, of course, also possible.

Illustrative Lazy Loading Embodiments

Certain embodiments facilitate lazy loading, meaning loading only certain properties of an object initially. One circumstance in which lazy loading can provide benefits is an application that provides a data grid that just displays certain high level properties, but that, upon selection of a row, drills down to a detailed view showing additional properties. For example, a company object may have a list of employees property. A developer may wish to develop a data grid displaying the company name and a number of employees and allow drill down to a list of details about the individual employees.

Certain embodiments provide methods of retrieving partial views of an object, omitting certain properties, for example, in the initial query populating an object. For example, an initial query may retrieve only the name property and identifier property, but nothing else. The developer can program the subsequent drill down by simply specifying their code a call to get the list of children. At that time, the application can retrieve the information that was not retrieved in the initial query. From the programmer's standpoint, that call is just going to take longer for to complete. Thus certain embodiments, facilitate the advantage of not loading all properties at once without requiring that the developer manage two different objects. In other words, the developer, does not have to be concerned about the fact that that data was or was not populated initially, because any necessary subsequent loading can happen automatically.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Certain embodiments provide techniques for using and accessing data including cases where a single database table is linked to an object and cases where multiple database tables are linked to an object. Certain embodiments relate to automatically translating changes for a collection of data, e.g., the books for a given author, to the appropriate back end operation. These embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

That which is claimed:
1. A computer implemented method comprising:
receiving a mapping for use in an application that accesses data from a data source, the mapping linking an object model in the application to the data source, the object model comprising an object having a data structure of one or more properties for data from the data source, the mapping comprising an object operation linked to a data source operation;

creating a change log for storing information about changes made to the object model in the application since a last synchronization;

receiving a data binding for linking the object and one or more data-displaying components in the application, wherein the data binding is configured to synchronize any changes made to the object with data displayed at each of the one or more data displaying components and to synchronize any changes made to data displayed at any of the one or more data-displaying components with the object; and providing the application for execution on a client computing device, wherein, the application comprises the mapping, the change log, the data binding, and a synchronization command, and wherein the application is configured to update the change log with changes made in the application and execute the synchronization command by accessing data at the data source using the mapping.

2. The method of claim 1, further comprising enforcing persistent identifier use to ensure that there is only one instance of the same data for the object provided in the application.

3. The method of claim 2, wherein a parameter of the object operation is a persistent identifier.

4. The method of claim 3, wherein the persistent identifier is a key for retrieving data from the data source.

5. The method of claim 2 wherein every object instance in the application is given a persistent identifier.

6. The method of claim 1, wherein the data source operation is one of: a create operation, a delete operation, an update operation, or a receive operation.

7. The method of claim 1, wherein, if the synchronization command is a commit command, accessing data at the data source comprises sending changes to the data source from the change log.

8. The method of claim 7, wherein accessing data at the data source further comprises sending an original version of the data with the changes for determination of a potential conflict with respect to current data stored at the data source.

9. The method of claim 1, wherein, if the synchronization command is a refresh command, accessing data at the data source comprises receiving data for the object according to the mapping.

10. The method of claim 1, wherein the data binding changes data displayed at the one or more data-displaying components in response to an event triggered when data of one or more object properties changes.

11. The method of claim 10, wherein, if the synchronization command is a refresh command, accessing data at the data source comprises receiving data for the object according to the mapping and updating the one or more data-displaying components according to the data binding.

12. The method of claim 1 further comprising providing demand paging using the mapping.

13. The method of claim 1 further comprising providing lazy loading using the mapping.

14. A method comprising:

receiving information specifying a collection object, the collection object comprising a data structure for the results of a query to a data source;

receiving a definition of an operation comprising the query and linking the collection to the data source;

receiving a data binding linking the collection object and a data grid, the data binding configured to change each instance of data displayed at the data grid corresponding to the collection object in response to an event triggered when data of the collection object changes and to synchronize any changes made to data displayed at the data grid by changing the data of the collection object; and providing an application for execution on a client computing device, wherein, the application comprises the collection object, the operation, the data binding, and a synchronization command, and wherein the application is configured to execute the synchronization command by accessing data at the data source using the operation.

15. The method of claim 14 further comprising enforcing persistent identifier use ensuring that there is only one instance of the same data for the collection object provided in the application.

16. The method of claim 15, wherein the persistent identifier is a key for retrieving data from the data source.

17. A system comprising:

an application development interface for receiving a mapping for use in an application that accesses data from a data source, the mapping linking an object model in the application to the data source, the object model comprising an object having a data structure of one or more properties for data from the data source, the mapping comprising an object operation linked to a data source operation, the application development interface further for receiving a data binding linking the object and a data-displaying component in the application, wherein the data binding is configured to synchronize any changes made to the object by changing data displayed at the data-displaying component and to synchronize any changes made to data displayed at the data-displaying component by changing the object;

a change log for storing, on a non-transitory computer readable medium, information about changes made to the object model in the application since a last synchronization;

a processor executing instruction to perform operations, the operations comprising providing the application for execution, by a client computing device, wherein the application comprises the mapping, the change log, the data binding, and a synchronization command, and wherein the application is configured to update the change log with changes made in the application and execute the synchronization command by accessing data at the data source using the mapping.

18. The system of claim 17 wherein the data binding changes the data displayed at the data-displaying component in response to an event triggered when data of one or more object properties changes.

19. The system of claim 18, wherein, if the synchronization command is a refresh command, accessing data at the data source comprises receiving data for the object according to the mapping and updating the data-displaying component according to the data binding.

20. The system of claim 17, wherein, if the synchronization command is a commit command, accessing data at the data source comprises sending changes to the data source from the change log.

21. The system of claim 17, wherein the application development interface enforces persistent identifier use ensuring that there is only one instance of the same data for the object provided in the application.

22. The system of claim 21, wherein the persistent identifier is a key for retrieving data from the data source.

23. The system of claim 21, wherein every object instance in the application is given a persistent identifier.

24. A non-transitory computer-readable medium on which is encoded program code, the program code comprising:
- program code for receiving a mapping for use in an application that accesses data from a data source, the mapping linking an object model in the application to the data source, the object model comprising an object having a data structure of one or more properties for data from the data source, the mapping comprising an object operation linked to a data source operation;
- program code for receiving a data binding for linking the object and a data-displaying component in the application, wherein the data binding is configured to change data displayed at the data-displaying component in response to an event triggered when data of one or more object properties changes and to synchronize any changes made to data displayed at the data-displaying component by changing the one or more object properties;
- program code for creating a change log for storing information about changes made to the object model in the application since a last synchronization; and
- program code for providing the application for execution on a client computing device, wherein, the application comprises the mapping, the data binding, the change log, and a synchronization command, and wherein the application is configured to update the change log with changes made in the application and execute the synchronization command by accessing data at the data source using the mapping.

25. A non-transitory computer-readable medium on which is encoded program code, the program code comprising:
- program code for providing a mapping of an object model to a data source for accessing data from the data source, the object model comprising an object having a data structure of one or more properties for data from the data source;
- program code for providing a change log for storing information about changes made since a last synchronization;
- program code for providing a data binding for linking the object and a data-displaying component, the data binding changing data displayed at the data-displaying component in response to an event triggered when data of one or more object properties changes and to synchronize any changes made to data displayed at the data-displaying component by changing the one or more object properties; and
- program code for executing a synchronization command by accessing data at the data source according to the mapping.

26. A method comprising:
- executing instructions on a computing platform so that a mapping is received for use in a computer application that accesses binary digital electronic signals representing data from a data source, the mapping linking an object model in the computer application to the data source, the object model comprising an object having a data structure of one or more properties for the binary digital electronic signals representing data from the data source, the mapping comprising an object operation linked to a data source operation;
- executing instructions on a computing platform so that a data binding is received for linking the object and a data-displaying component in the application, the data binding synchronizing any changes made to the data displayed at each of the data-displaying components in response to an event triggered when data of one or more object properties changes and synchronizing any changes made to data displayed at the data-displaying component by changing the one or more object properties;
- executing instructions on the computing platform so that a change log is created for storing, in a memory location of the computing platform, binary digital electronic signals representing changes made to the object model in the computer application since a last synchronization; and
- providing the computer application for execution on a client computing platform, wherein, the computer application comprises the mapping, the change log, the data binding, and a synchronization command, and wherein the computer application is configured to update the change log with changes made in the computer application and execute the synchronization command by accessing the binary digital electronic signals representing data at the data source using the mapping.

27. The method of claim 1, wherein the data binding is configured to synchronize any changes made to the object with data displayed at each of multiple data-displaying components and to synchronize any changes made to data displayed at any of the multiple data-displaying components with the object and with data displayed at other data displaying components of the multiple data displaying components.

* * * * *